US005429154A

United States Patent [19]

Kato

[11] Patent Number: 5,429,154

[45] Date of Patent: Jul. 4, 1995

[54] THREE-WAY ELECTROMAGNETIC VALVE

[75] Inventor: Nobuyuki Kato, Anjo, Japan

[73] Assignee: Nippondensco Co., Ltd., Kariya, Japan

[21] Appl. No.: 219,721

[22] Filed: Mar. 29, 1994

[30] Foreign Application Priority Data

Mar. 31, 1993 [JP] Japan .................................. 5-073961

[51] Int. Cl.[6] ...................... F15B 13/044; F16K 11/04

[52] U.S. Cl. ........................... 137/625.65; 251/129.16; 239/533.8

[58] Field of Search .............. 137/625.65; 251/129.16; 239/584, 533.8

[56] References Cited

U.S. PATENT DOCUMENTS 4,928,887 5/1990 Miettaux .
5,038,826 8/1991 Kabai et al. .

FOREIGN PATENT DOCUMENTS 1-190964 8/1989 Japan .
2-253072 10/1990 Japan .

*Primary Examiner*—Gerald A. Michalsky
*Attorney, Agent, or Firm*—Cushman, Darby & Cushman

[57] ABSTRACT

A three-way electromagnetic valve controls the opening and closing of a fuel injection valve by enabling a back pressure chamber in which fuel for serving to bias a nozzle needle of the fuel injection valve in the valve closing direction is stored to communicate alternatively with a high pressure chamber in which a high pressure fuel is stored or a low pressure chamber in which a low pressure fuel is stored, and is prevented from any accumulation of extraneous material in clearances of a sliding portion. This three-way electromagnetic valve includes a valve body having a sliding hole, and control, supply and discharge ports through which the sliding hole is enabled to communicate with the back pressure chamber, the high pressure chamber and the low pressure chamber, respectively, and a valve member slidably disposed in the sliding hole and capable of sliding on receiving an electromagnetic force of an electromagnetic actuator, the valve member serving to change over alternatively from one of a first communication state that the supply port and the control port are communicated with each other and a second communication state that the control port and the discharge port are communicated with each other to the other. The supply port is opened in the sliding wall of the sliding hole in the direction perpendicular to the sliding wall, and the clearance between the sliding hole and the valve member is so set as to be made large at the position remote from the supply port but small at the position adjacent to the supply port.

27 Claims, 7 Drawing Sheets

THREE-WAY ELECTROMAGNETIC VALVE

BACKGROUND OF THE INVENTION

1. Field of the Invention

The present invention relates to a three-way electromagnetic valve which is suitable for controlling a high pressure fluid and, for example, suitable for use in a fuel injection system of a diesel engine.

2. Description of the Related Art

Heretofore, a diesel engine employs an injector which injects a high pressure fuel supplied from, for example, a common rail to a cylinder through a nozzle opened and closed by a nozzle needle, and there has been known a three-way electromagnetic valve which is mounted in such an injector to control the seat and lift of the nozzle needle by changing over a back pressure acting on the nozzle needle between high and low levels.

An example of this kind of three-way electromagnetic valve is disclosed in, for example, Japanese Patent Unexamined Publication No. 2-253072, in which valve provides with a sliding portion shown in FIG. 7.

A sliding portion 410 of the conventional three-way electromagnetic valve will be described in a schematic structure thereof with reference to FIG. 7.

A valve body 412 is a cylindrical body provided with an outer valve sliding hole 414 formed by boring in the central portion thereof. The valve body 412 is further provided therein with an inlet passage 416 through which a high pressure fluid is introduced into the sliding portion 410 of the three-way electromagnetic valve, a supply port 418 opened in the wall surface of the outer valve sliding hole 414 so as to be communicated with the inlet passage 416, a groove 420 annularly formed by boring in the wall surface of the outer valve sliding hole 414 so as to be communicated with the supply port 418, a discharge port 422 formed by boring so as to be communicated with the lower end portion of the outer valve sliding hole 414, a discharge passage 424 formed in communication with the discharge port 422, a funnel-shaped valve seat 426 formed in communication with the lower end portion of the outer valve sliding hole 414 so as to be substantially coaxial with the outer valve sliding hole 414, and a control port 428 communicated with the outer valve sliding hole 414 through the valve seat 426.

into the outer valve sliding hole 414 is slidably inserted a cylindrical outer valve 434 which has a poppet portion 430 formed at the lower end portion thereof and a flange portion 432 formed at the upper end portion thereof. The outer valve 434 can be moved relatively in the axial direction thereof so that the poppet portion 430 can be brought into contact with and moved apart from the valve seat 426 of the valve body 412, thereby making it possible to stop and provide communication between the discharge port 422 and the control port 428 in response to the contact and departure of the poppet portion 430 with and from the valve seat 426.

The outer valve 434 is provided therein with an inner valve sliding hole 436 formed by boring so as to be opened at the flange portion 432, an inner chamber 438 formed in the central portion thereof so as to be continuously connected with the inner valve sliding hole 436, a funnel-shaped inner seat 440 which is formed substantially coaxially with the inner valve sliding hole 436 so as to be continuously connected with the inner cheer 438, a passage 442 communicated with the inner chamber 438 through the inner seat 440, and a plurality of through holes 444 which are formed by boring substantially at equal angular intervals so as to extend in the radial direction of the inner sliding hole 436 for serving to enable the inner chamber 438 and the groove 420 of the outer valve sliding hole 414 to communicate with each other. Incidentally, an internal path 445 is formed by following from the inner chamber 438 to the through holes 444.

An inner valve 446 of a stepped cylindrical shape in which the diameter of the lower end portion thereof is small and the diameter of the central portion thereof is large is slidably inserted in the inner valve sliding hole 436. The central portion of the inner valve 446 serves to form a sliding shaft portion 448 and the lower end portion thereof serves to form a poppet portion 450. By changing the relative position of the inner valve 446 and the outer valve 434 in the axial direction thereof, the poppet portion 450 can be brought into contact with and moved apart from the inner seat 440, thereby making it possible to stop and provide communication between the inner chamber 438 of the outer valve 434 and the passage 442 in response to the contact and departure of the poppet portion 450 with and from the inner seat 440.

With such construction of the sliding portion 410, when the outer valve 434 is seated on the valve seat 426 to make the inner valve move apart from the inner seat 440, the high pressure fuel supplied through the inlet passage 416 connected to, for example, a common rail can be introduced into the control port 428 via the supply port 418 and the internal path 445, while, when the outer valve 434 is moved apart from the valve seat 426 to make the inner valve 446 seat on the inner seat 440, the high pressure fuel supplied through the inlet passage 416 is made to stop flowing so that the fuel is guided from the control port 428 to the discharge port 422.

In the sliding portion 410 of such conventional three-way electromagnetic valve, the clearance between the outer valve sliding hole 414 and the outer valve 434 and the clearance between the inner valve sliding hole 436 and the inner valve 446 are set to be about 1 to 2 μm in terms of diameter for the purpose of keeping the fuel leakage at a minimum to thereby prevent the loss of driving torque of, for example, the fuel pump and a reduction in the fuel injection pressure. Accordingly, the valve body 412 and the outer valve 434 as well as the outer valve 434 and the inner valve 446 are made to slide on each other precisely.

However, since the pressure of the high pressure fuel introduced into the sliding portion 410 of the three-way electromagnetic valve is as high as about 120 MPa, the valve body 412 is deformed outwardly in the radial direction in the vicinity of the groove 420 due to the effect of the high pressure fuel introduced into the groove 420. Such deformation of the valve body 412 causes the clearance between the outer valve sliding hole 414 and the outer valve 434 to be increased. Therefore, the high pressure fuel leaks out into the increased clearance and acts to pressurize the whole of the wall surface of the outer valve sliding hole 414, with a result that the valve body 412 is deformed outwardly. FIG. 8 shows an example of the measured values of the extent of deformation of the valve body 412. In FIG. 8, the extent of deformation of the valve body 412 is $1.97\times10^{-3}$ mm in the vicinity of the groove 420 and $2.80\times10^{-4}$ mm in the vicinity of the discharge port 422. Accordingly, as shown by the broken line, the valve body 412 is deformed such that the extent of deformation thereof is large in the vicinity of the groove 420 but small at the upper and lower end portions of the outer valve sliding hole 414.

Accordingly, part of the high pressure fuel flowing through the supply port 418 into the three-way electromagnetic valve 400 passes through the clearance enlarged by the above deformation of the valve body 412 and leaks out through the groove 420 toward the upper and lower end portions of the outer valve sliding hole 414. In this case, there is a possibility that a foreign matter contained in the high pressure fuel, such as fine chip, cannot pass through the portion with small clearance at the upper and lower end portions of the outer valve sliding hole 414 to thereby be filled with therein, though it can pass through the portion with large clearance in the vicinity of the groove 420, so that it accumulates in the clearance. Such accumulation of the foreign matter gives rise to a problem of bad sliding, sticking and the like of the outer valve.

SUMMARY OF THE INVENTION

The present invention was developed in view of the above problem and an object of the invention is to provide a three-way electromagnetic valve which is prevented from any accumulation of foreign matter in clearances of a sliding portion thereof.

In order to achieve this end, there is provided according to the present invention a three-way electromagnetic valve for controlling closing and opening of a high pressure chamber in which a high pressure fluid is stored and a low pressure chamber in which a low pressure fluid is stored, the valve including: a valve body having a first sliding hole, and control, supply and discharge ports through which the first sliding hole is enabled to communicate with a back pressure chamber, the high pressure chamber and the lower pressure chamber, respectively; and valve means slidably disposed in the first sliding hole and capable of sliding on receiving an electromagnetic force of an electromagnetic actuator and for changing over alternatively from one of a first communication state in which the supply port and the control port are communicated with each other and a second communication state in which the control port and the discharge pore are communicated with each other to the other, and wherein the supply port is opened in a sliding wall of the sliding hole in the direction perpendicular to the sliding wall, and a clearance between the first sliding hole and the sliding surface of the valve means is so set as to be made large at the position remote from the supply port but small at the position adjacent to the supply port.

In the three-way electromagnetic valve of the above construction, the clearance between the first sliding hole and the sliding surface of the valve means is so set as to be made large at the position remote from the supply port but small at the position adjacent to the support port, and therefore, even if the valve body is deformed by the effect of the high pressure fluid introduced through the supply port, the clearance between the first sliding hole and the sliding surface of the valve means is prevented from becoming smaller at the position remote from the supply port than at the position adjacent to the supply port. Accordingly, a foreign matter of the size that is capable of passing through the clearance at the position adjacent to the supply port is allowed to pass through the clearance at the position remote from the supply port, with a result that there is caused no clogging with the extraneous material. In consequence, the valve means can be prevented from the bad sliding, sticking and the like caused by the accumulation of the extraneous material.

DETAILED DESCRIPTION OF THE PREFERRED EMBODIMENTS

Preferred embodiments of the present invention will be described hereinafter with reference to the drawings.

(Embodiment 1)

Figure 1:
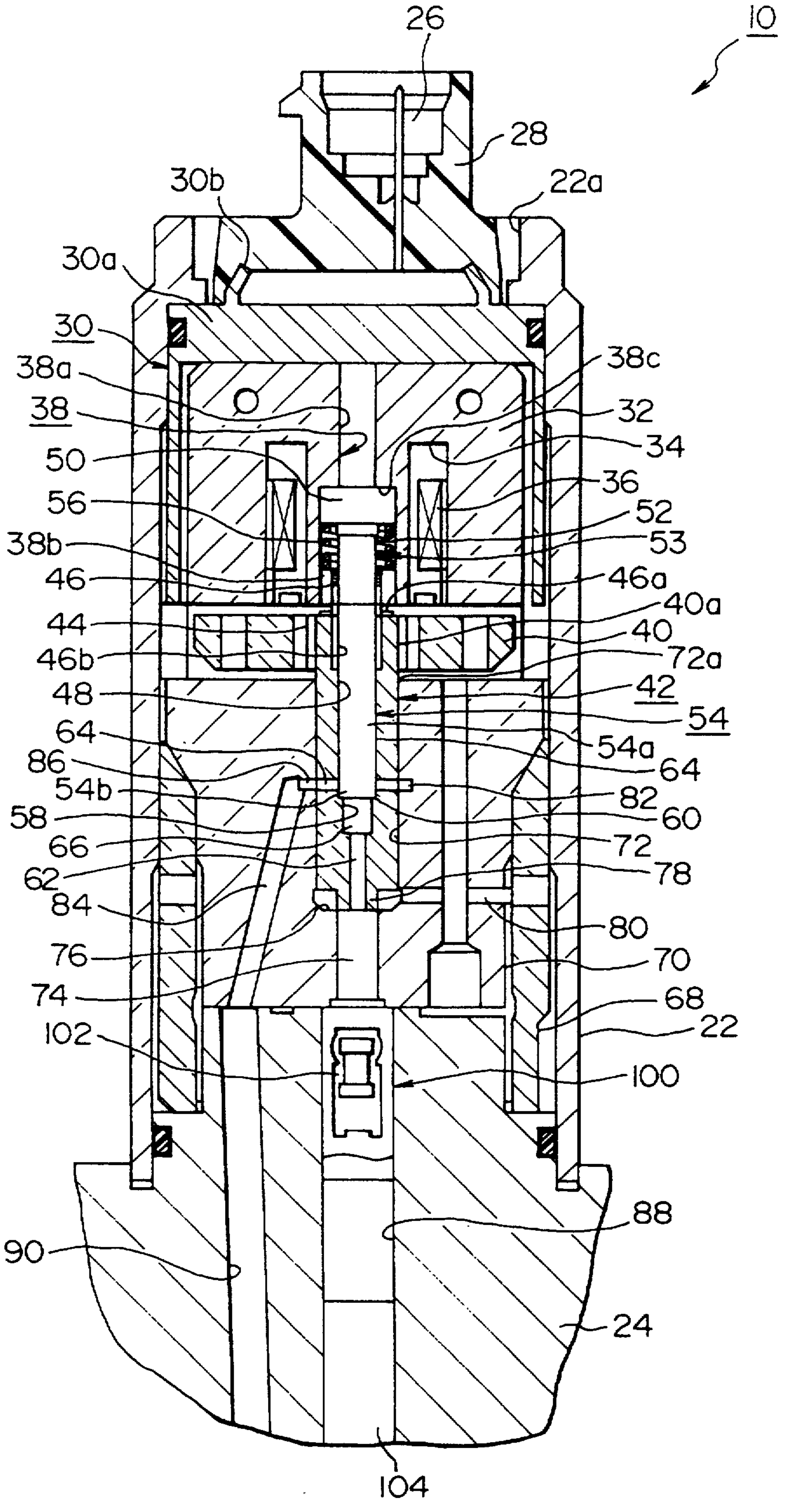
FIG. 1 is a sectional view of a three-way electromagnetic valve according to a first embodiment of the present invention.
Figure 2:
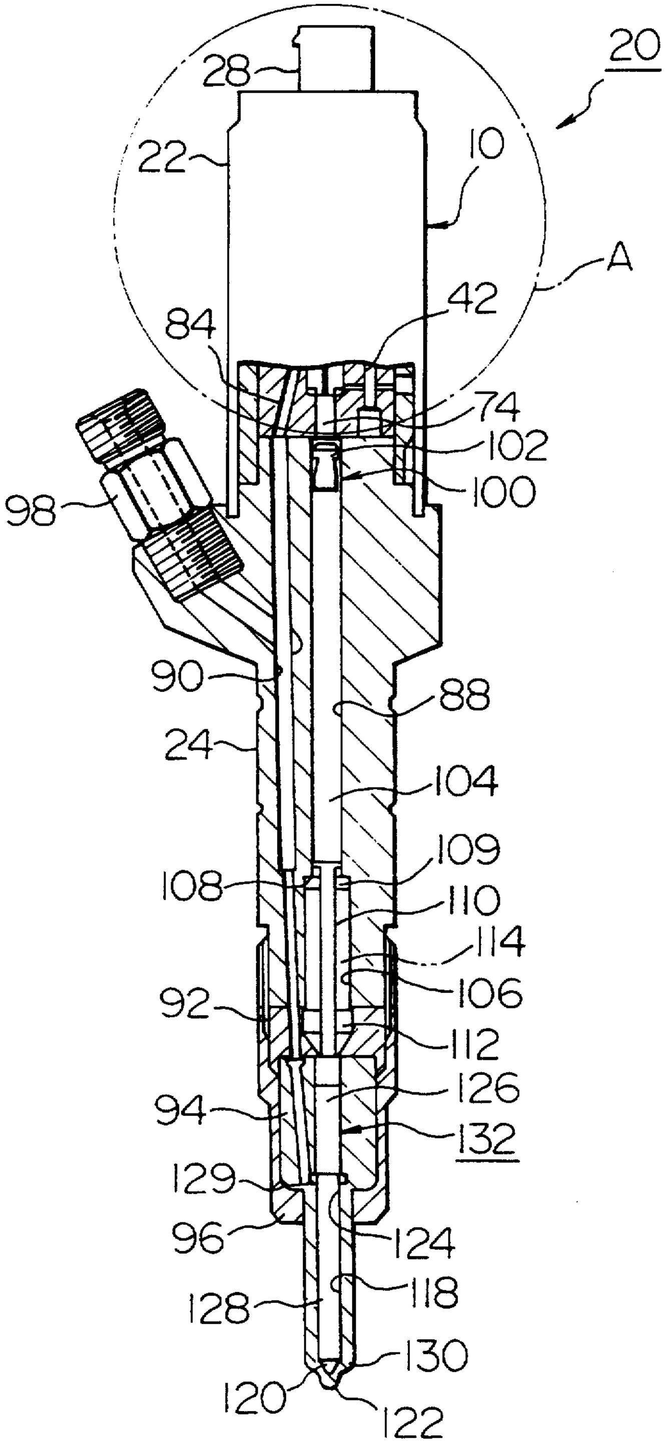
FIG. 2 is a sectional view of an injector in which the three-way electromagnetic valve according to the first embodiment is incorporated.

FIG. 1 is an enlarged sectional view of a three-way electromagnetic valve 10 according to a first embodiment. The three-way electromagnetic valve 10 is incorporated in an injector 20 for diesel engine use as shown in FIG. 2.

First, structure of the three-way electromagnetic valve 10 and the vicinity thereof will be described by referring to FIG. 1.

As shown in FIG. 1, a casing 22 of the three-way electromagnetic valve 10 is securely fixed at the lower end portion thereof to a body lower 24. In an upper end opening portion 22*a* of the casing 22 is inserted a connector 28 which has a terminal 26 formed therein, and the lower end portion of the connector 28 is fixed by caulking to a caulking portion **30*b* provided on a bottom portion 30*a* of a solenoid housing 30 which is fitted in the casing 22. The solenoid housing 30 is formed in the shape of a hollow cylinder so as to have the bottom portion 30*a* thereof formed on the side of the connector 28, and a stator 32 is received and fixed within the solenoid housing 30. Further, the stator 32 is formed therein by boring with an annular groove 34 in which a magnet coil 36 is wound. The magnet coil 36 is connected to the connector 28 through a lead wire which is not shown, so that it is possible to excite the magnet coil 36 by supplying an electric current through the connector 28. It is noted that the stator 32 serves as the fixed iron core. Moreover, the stator 32 is formed therein by boring with a central hole 38 which provides with a small-diameter portion 38*a* and a large-diameter portion 38*b* and extends through the central portion of the stator 32. A step portion 38*c* is formed at the connection between the small-diameter portion 38*a* and the large-diameter portion 38*b***.

A disc-shaped movable iron core 40 having an opening **40*a* formed in the central portion thereof is disposed below the stator 32 as viewed in the drawing. In the opening 40*a* of the movable iron core 40 is fitted and fixed a hollow cylindrical outer valve 42. The outer valve 42 is formed therein with an inside hole 44 which is made to open on the side of the movable iron core 40, and a hollow cylindrical spring seat member 46 having a flange portion 46*a* is fitted in the inside hole 44. The upper half portion of the spring seat member 46 is made to project into the large-diameter portion 38*b* of the central hole 38**.

Further, the outer valve 42 is formed therein with an inner valve sliding hole 48 which has a smaller diameter than the inside hole 44 and is connected continuously with the inside hole 44. The inner valve sliding hole 48 is actually continuous to an inner hole **46*b* of the spring seat member 46. Within these inner valve sliding hole 48 and inner hole 46*b* are slidably inserted a head member 53 having a head 50 of large diameter and a shaft portion 52 of small diameter and an inner valve 54 connected continuously with the shaft portion 52. The portion of the head member 53 adjacent to the head 50 is projected out of the spring seat member 46 and inserted in the large-diameter portion 38*b* of the central hole 38 so that the head 50 is brought into contact with the step portion 38*c*. A compression coiled spring 56 is interposed between the head 50 and the flange portion 46*a* of the spring seat member 46 so as to bias the head 50 in the direction in which it is separated from the outer valve 42 and the movable iron core 40. For this reason, the movable iron core 40 and the outer valve 42 are separated from the stator 32 when the magnet coil 36 is demagnetized (or supplied with no electric current), and however, as the magnet coil 36 is energized, the movable iron core 40 is attracted to the stator 32 so that the movable iron core 40 and the outer valve 42 are moved close to the stator 32 against the biasing force of the compression coiled spring 56**.

On the other hand, the outer valve 42 is provided therein with an inner chamber 58 which is formed in the central portion of the outer valve 42 so as to be connected continuously with the inner valve sliding hole 48, an inner seat 60 which is formed substantially coaxially with the inner valve sliding hole 48 so as to be connected continuously with the inner chamber 58, a passage 62 which is communicated with the inner chamber 58 through the inner seat 60, and a plurality of through holes 64 which are formed by boring substantially at equal angular intervals so as to extend in the radial direction of the inner valve sliding hole 48 and are communicated with the inner chamber 58, thereby forming a continuous inner path 66 leading from the through hole 64 to the passage 62 via the inner chamber 58. The inner path 66 is closed and opened in accordance with that of a poppet portion **54*b* formed at the tip end of a sliding shaft portion 54*a* of the inner valve 54 brought into contact with and moved apart from the inner seat 60**.

The outer valve 42 is slidably inserted in an outer valve sliding hole 72 which is formed by boring within a valve body 70 fitted in the casing 22 through a spacer ring 68. The upper end of the outer valve sliding hole 72 is an opening end **72*a*, while the lower end of the outer valve sliding hole 72 is communicated with a control hole 74 which is substantially coaxial with the outer valve sliding hole 72 and opened in the lower end portion of the valve body 70. Further, a valve seat 76 is formed in the connecting portion between the outer valve sliding hole 72 and the control hole 74. On the other hand, a poppet portion 78 corresponding to the shape of the valve seat 76 is formed at the lower end of the outer valve 42, so that it is possible to provide and stop communication between the control hole 74 and the outer valve sliding hole 72 by making the poppet portion 78 move apart from and seat on the seat valve 76 owing to the reciprocating sliding motion of the outer valve 42 within the outer valve sliding hole 72**.

Moreover, the valve body 70 is formed therein with a discharge passage 80 which extends in the radial direction of the valve body 70 so as to be opened in the outer peripheral surface of the valve body 70 and communicated with the lower end portion of the outer valve sliding hole 72. The discharge passage 80 is connected to a drain tank (not shown) equipped outside of the injector 20. When the poppet portion 78 of the outer valve 42 is moved apart from the valve seat 76, the discharge passage 80 is communicated with the control hole 74 through the outer valve sliding hole 72 so as to enable the fuel coming from the control hole 74 to flow out to the drain tank.

In addition, the valve body 70 is formed therein by boring with an annular groove 82 which is opened into the outer valve sliding hole 72. The groove 82 is located at a position corresponding to the through holes 64 of the outer valve 42 so that, even if the relative position of the outer valve 42 and the valve body 70 in the axial direction is changed within the set range due to the sliding motion of the outer valve 42, communication between the through holes 64 and the groove 82 can be provided. Further, the groove 82 is formed therein with a supply port 86 which is communicated with a high pressure fuel passage 84 which is formed by boring so as to be opened in the lower end of the valve body 70, so that the fuel coming through the high pressure fuel passage 84 can be introduced into the through holes 64 through the groove 82, while the same fuel can be introduced into the control hole 74 through the inside path 66 when the poppet portion **54*b* of the inner valve 54 is moved apart from the inner seat 60**.

As shown in FIGS. 1 and 2, the three-way electromagnetic valve 10 is securely fixed to the body lower 24. The body lower 24 has a cylinder 88 formed by boring in the central portion thereof so as to extend along the axis and a fuel supply passage 90 formed by boring so as to extend side by side with the cylinder 88. The opening ends of the control hole 74 and the high pressure fuel passage 84 of the three-way electromagnetic valve 10 are communicated with the cylinder 88 and the fuel supply passage 90, respectively. For this reason, by changing over the three-way electromagnetic valve 10, the fuel supplied through the fuel supply passage 90 can be introduced into the cylinder 88 through the three-way electromagnetic valve 10 and the fuel coming from the cylinder 88 can be made to flow out to the drain tank through the three-way electromagnetic valve 10.

As shown in FIG. 2, a connecting member 92 is disposed below the body lower 24 in contact therewith and a valve casing 94 is disposed below the connecting member 92 as viewed in the drawing. Further, these body lower 24, connecting member 92 and valve casing 94 are combined in a unit body by a retaining ring 96 fitted on throughout from the valve casing 94 to the tip end portion of the body lower 24. Moreover, an inlet 98 which is to be connected to a high pressure fuel supply source (not shown) and serves as the introduction port for the high pressure fuel is screwed and securely fixed to the body lower 24. The inlet 98 and the fuel supply passage 90 are communicated with each other within the body lower 24.

The cylinder 88 is formed in the end portion thereof which is in contact with the three-way electromagnetic valve 10 with a pressure chamber 102 in which a one-way orifice 100 is received. A piston 104 is slidably inserted in the cylinder 88, and one end of the piston 104 is kept in contact with the pressure chamber 102. For this reason, by introducing the high pressure fuel supplied through the three-way electromagnetic valve 10 into the pressure chamber 102, it is possible to make the same fuel act as the back pressure for biasing the piston 104 downward in the drawing. Further, by discharging the fuel through the control hole 74 and the discharge passage 80 of the three-way electromagnetic valve 10, it is possible to reduce or cancel the back pressure.

A spring chamber 106 formed to extend over both the body lower 24 and the connecting member 92 and having a diameter larger than that of the cylinder 88 is connected continuously with the other end portion of the cylinder 88 with a step portion 108 formed between them. In the spring chamber 106 is inserted a piston pin 110 one end of which is securely fixed to the piston 104. A flange 112 opposite to the step portion 108 is fixedly fitted on the piston pin 110, and a compression coiled spring 114 is interposed between the flange 112 and a ring washer 109 disposed close to the step portion so as to bias the flange 112 downwardly in the drawing.

The valve casing 94 connected to the connecting member 92 is formed therein by boring with a valve body sliding hole 116 communicating with the spring chamber 106, an injection fuel passage 118 connected continuously with the valve body sliding hole 116 and a seat portion 120 connected continuously with the injection fuel passage 118. The valve casing 94 is formed by boring at the tip end thereof with a nozzle 122 which is communicated with the seat portion 120 and opened to the outside. An annular fuel receiving chamber 124 is formed in the connecting portion between the injection fuel passage 118 and the valve body sliding hole 116. The fuel receiving chamber 124 is communicated with the fuel supply passage 90 which extends from the body lower 24 through the connecting member 92 to the valve casing 94.

Further, the other end of the piston pin 110 is connected to a nozzle needle 132 which comprises a large-diameter portion 126 slidably inserted in the valve body sliding hole 116, a small-diameter portion 128 connected continuously with the large-diameter portion 126 and extending through within the injection fuel passage 118, and a conical valve body portion 130 formed at the tip end of the small-diameter portion 128. It is noted that there is maintained between the injection fuel passage 118 and the small-diameter portion 128 a clearance enough for the fuel to pass through. The nozzle needle 132 can be moved relatively in the vertical direction in the drawing so that it is possible to open and close the nozzle 122 by making the valve body portion 130 move apart from and seat on the seat portion 120 in accordance with the movement of the nozzle needle 132. For this reason, the high pressure fuel supplied from the high pressure fuel supply source such as a common rail (not shown) through the inlet, the fuel supply passage 90, the fuel receiving chamber 124 and the injection fuel passage 118 can be allowed and ceased to be injected in response to the opening and closing of the nozzle 122.

The nozzle needle 132 is biased downwardly in the drawing by the compression coiled spring 114 through the intermediary of the piston pin 110. Further, by making the back pressure of the pressure chamber 102 act on one end of the piston 104 by operating the three-way electromagnetic valve 10, it is possible to bias the nozzle needle 132 in the same direction and, in addition, by reducing or canceling the back pressure of the pressure chamber 102, the biasing force can be relieved. On the other hand, the pressure of the high pressure fuel introduced into the fuel receiving chamber 124 serves to apply a force for biasing the nozzle needle 132 upwardly in the drawing to a step portion 129 between the large-diameter portion 126 and the small-diameter portion 128 of the nozzle needle 132. It is noted here that the pressure of the high pressure fuel introduced into the pressure chamber 102 is substantially equal to that of the high pressure fuel introduced into the fuel receiving chamber 124, but the active area of the piston 104 is set to be larger than that of the step portion 129. For this reason, when the back pressure of the pressure chamber 102 is applied to one end of the piston 104, the nozzle needle 132 is biased downwardly in the drawing, and however, when the back pressure of the pressure chamber 102 is reduced or canceled, the nozzle needle 132 can be moved upwardly in the drawing against the biasing force of the compression coiled spring 114 by the action of the high pressure fuel introduced into the fuel receiving chamber 124. Owing to the upward movement of the nozzle needle 132, the valve body portion 130 is caused to move apart from the seat portion 120 so that the nozzle 122 is opened.

Operations of the three-way electromagnetic valve 10 having the above structure and the injector 20 incorporating the same are identical with those of the prior arts and well known by those skilled in the art, and therefore, detailed description thereof will be omitted.

Figure 3:
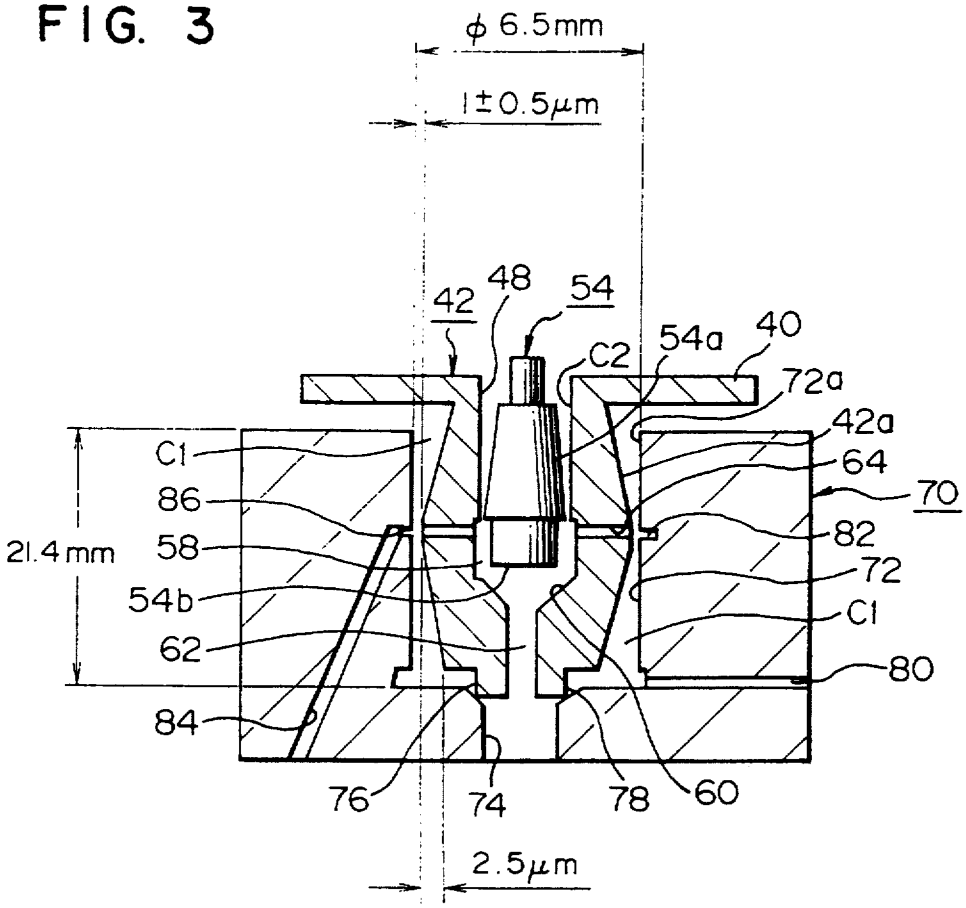
FIG. 3 is a schematic view for illustrating of the clearance of a sliding portion of the three-way electromagnetic valve according to the first embodiment.
Figure 4:
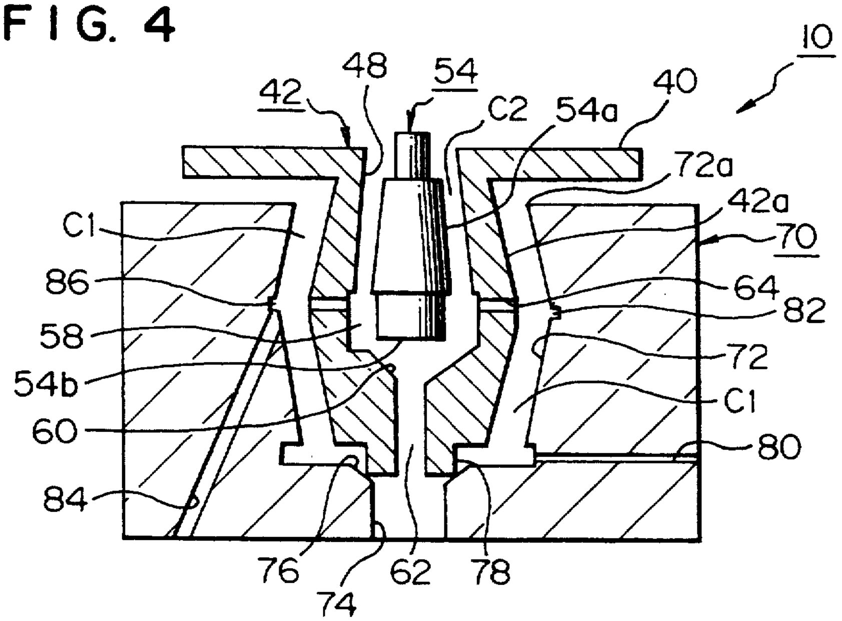
FIG. 4 is a schematic view for illustrating of the deformation of members and the clearance of the sliding portion in the case that a high pressure fuel is introduced into the three-way electromagnetic valve according to the first embodiment.

FIG. 3 is a schematic view of the three-way electromagnetic valve 10 in the state that no high pressure fuel is supplied, and FIG. 4 is a schematic view of the same in the state that a high pressure fuel is supplied thereto. By referring to FIGS. 3 and 4, structure and deformation of the sliding portion of the three-way electromagnetic valve 10 will be described in the following. Incidentally, in FIGS. 3 and 4, the inner valve 54, the outer valve 42, the valve body 70 and the constituting portions thereof are designated by the same reference numerals as those in FIGS. 1 and 2.

As shown in FIG. 3, the valve body 70 is formed therein with the outer valve sliding hole 72 of diameter 6.5 mm and depth 21.4 mm. The diameter of the outer valve sliding hole 72 is substantially uniform and unchanged except the portion corresponding to the groove 82. On the other hand, the outer periphery of the sliding portion 42*a* of the outer valve 42 is tapered so that the diameter thereof is reduced as going from the vicinity of the through holes 64 toward the movable iron core 40 as well as from the vicinity of the through holes 64 toward the poppet portion 78. Such tapered shape can be machined easily by making use of a NC lathe of high accuracy. Accordingly, a clearance C1 between the sliding portion 42*a* of the outer valve 42 and the outer valve sliding hole 72 is made larger as going from the vicinity of the through holes 46 of the outer valve 42 toward the both end portions thereof adjacent to the movable iron core 40 and the poppet portion 78, respectively. The clearance C1 is set to be $1\pm0.5$ $\mu$m in the vicinity of the through holes 64 and set to a value still larger by 2.5 $\mu$m in the vicinity of the opposite end portions of the outer valve 42.

Further, the diameter of the inner valve sliding hole 48 of the outer valve 42 is substantially uniform and unchanged throughout the whole sliding area from the opening adjacent to the movable iron core 40 to the connecting portion with the inner chamber 58, and however, the sliding shaft portion 54*a* of the inner valve 54 is tapered so that the diameter thereof is decreased as going away from the poppet portion 54*b*. Accordingly, a clearance C2 between the sliding shaft portion 54*a* of the inner valve 54 and the inner valve sliding hole 48 is made larger as going from the inner chamber 58 toward the movable iron core 40.

As shown in FIG. 4, when the three-way electromagnetic valve 10 is supplied with a high pressure fuel coming through the high pressure fuel passage 84, the valve body 70 is deformed by the pressure of the high pressure fuel flowing out through the groove 82 into the outer valve slidomg hole 72. For this reason, the diameter of the outer valve sliding hole 72 becomes large in the vicinity of the groove 82 but small at the opening end 72*a* and at the discharge passage 80. However, since the sliding portion 42*a* of the outer valve 42 is tapered as described above, the clearance at the opening end 72*a* and at the discharge passage 80 can be maintained greater than that in the vicinity of the groove 82. Accordingly, even if an extraneous material contained in the high pressure fuel, such as fine chip, enters through the groove 82 into the outer valve sliding hole 72, the extraneous material passing through the clearance in the vicinity of the groove 82 is made to pass through the clearance at the opening end 72*a* and at the discharge passage 80, which is maintained greater than the former clearance, with a result that there is caused no clogging with the extraneous material. Therefore, the outer valve 42 can be prevented from the bad sliding, sticking and the like caused by the accumulation of the extraneous material.

Moreover, even if the outer valve 42 is deformed elastically by the effect of the high pressure fuel, the clearance at the movable iron core 40 can be maintained greater than the clearance at the inner chamber 58. Accordingly, similarly to the above case, the extraneous material flowing from the inner chamber 58 into the clearance C2 is allowed to flow out toward the movable iron core 40, with the result that there is caused no accumulation of the extraneous material in the clearance C2. In consequence, the inner valve 54 can be prevented from the bad sliding, sticking and the like caused by the accumulation of the extraneous material.

(Embodiment 2)

Figure 5A:
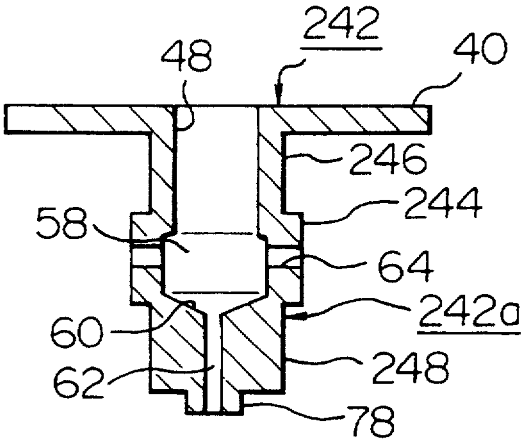
FIGS. 5A and 5B are schematic views of the sliding portion of a three-way electromagnetic valve according to a second embodiment of the present invention, FIG. 5A being a schematic view showing the shape of an outer valve and FIG. 5B being a schematic view for illustrating of the deformation of the members and the clearance of the sliding portion in the case that the high pressure fuel is introduced into the three-way electromagnetic valve.
Figure 5B:
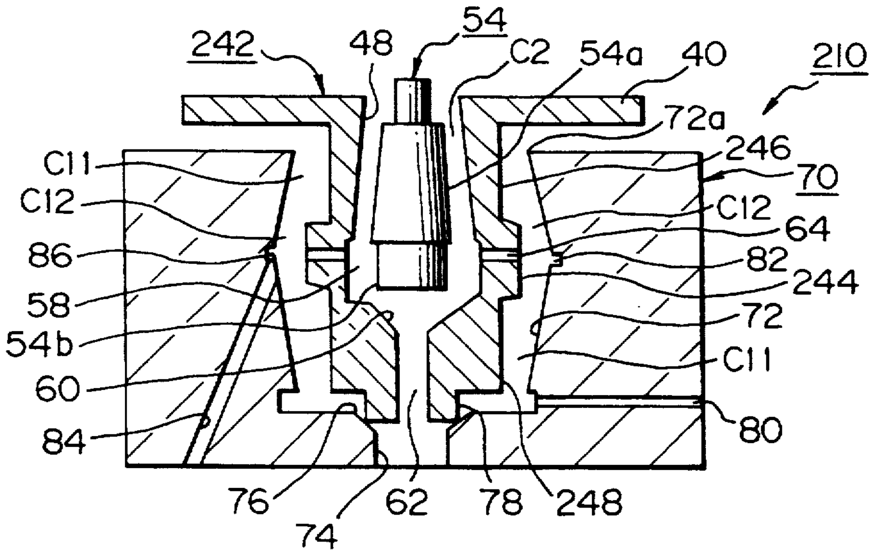

FIGS. 5A and 5B show a three-way electromagnetic valve 210 according to a second embodiment. In this embodiment, the outer valve 42 of the Embodiment 1 is changed in shape, while the other members are identical with those of the Embodiment 1. Therefore, in FIGS. 5A and 5B, only the changed portions are designated by the reference numerals on the order of 200, while the other portions are designated by the same reference numerals as those of the Embodiment 1.

As shown in FIG. 5A, an outer valve 242 of this embodiment comprises a large-diameter portion 244 formed in the vicinity of the through holes 64 and small-diameter portions 246 and 248 formed on both sides of the large diameter portion 244 (on the side of the movable iron core 40 and on the side of the poppet portion 78), so that the shape of a sliding portion 242*a* of the outer valve 242 has step portions formed at the connecting portions between the large-diameter portion 244 and the small-diameter portions 246, 248.

As shown in FIG. 5B, in the three-way electromagnetic valve 210 in which the outer valve 242 is set, when the high pressure fuel coming through the high pressure fuel passage 84 is supplied, the valve body 70 is deformed as in the case of the Embodiment 1. However, since the sliding section 242*a* has the above-described shape, a clearance C11 at the opening end 72*a* of the outer valve slide hole 72 and at the discharge passage 80 can be maintained greater than a clearance C12 in the vicinity of the groove 82. Accordingly, even if an extraneous material contained in the high pressure fuel, such as fine chip, enters through the groove 82 into the outer valve sliding hole 72, the extraneous material passing through the clearance C12 in the vicinity of the groove 82 is made to pass through the clearance C11 at the opening end 72*a* and at the discharge passage 80, which is maintained greater than the clearance C12, with the result that there is caused no clogging with the extraneous material. Therefore, the outer valve 42 can be prevented from the bad sliding, sticking and the like caused by the accumulation of the extraneous material.

Further, the clearance C2 between the outer valve 242 and the inner valve 54 is maintained like the Embodiment 1, and therefore, the effect thereof is equal to that of the Embodiment 1.

(Embodiment 3)

Figure 6A:
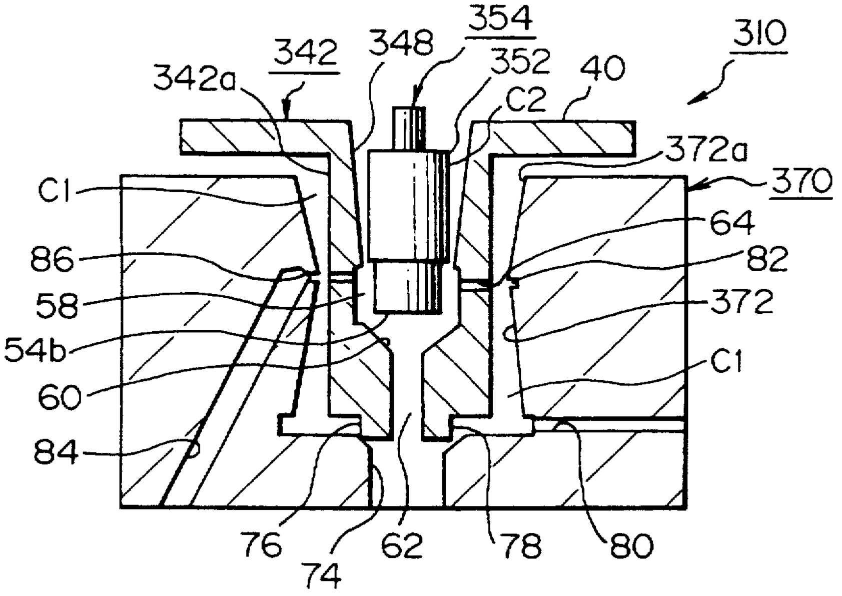
FIGS. 6A and 6B are schematic views of the sliding portion of a three-way electromagnetic valve according to a third embodiment of the present invention, FIG. 6A being a schematic view showing the state where the high pressure fuel is not introduced into the three-way electromagnetic valve and FIG. 6B being a schematic view for illustrating of the deformation of the members and the clearance of the sliding portion in the case that the high pressure fuel is introduced into the three-way electromagnetic valve.
Figure 6B:
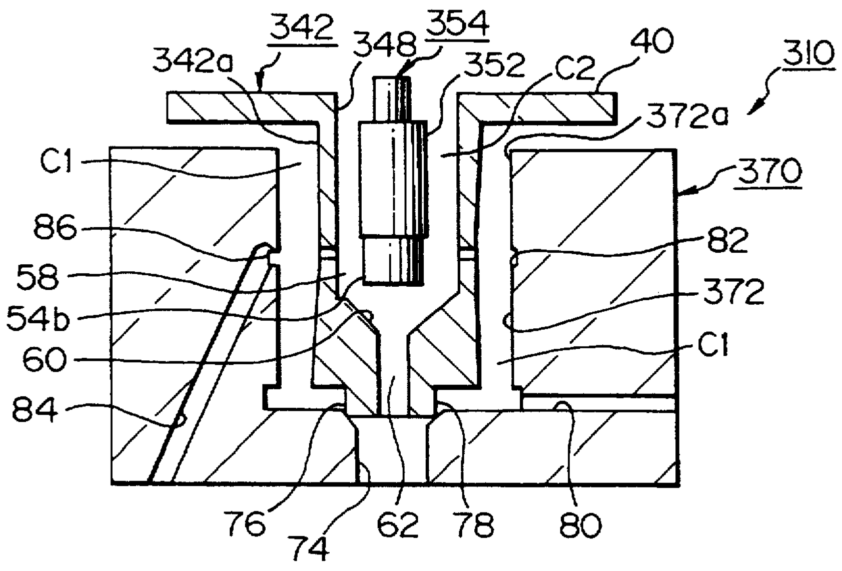
Figure 7:
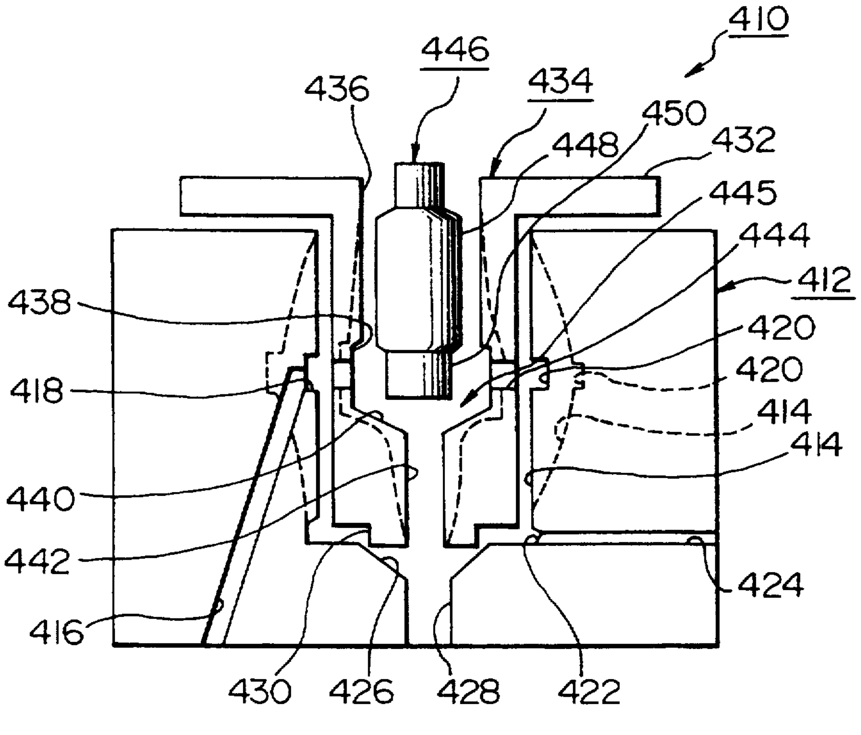
FIG. 7 PRIOR ART
FIG. 7 is a schematic view for illustrating the shape and clearance of the sliding portion of a conventional three-way electromagnetic valve.
Figure 8:
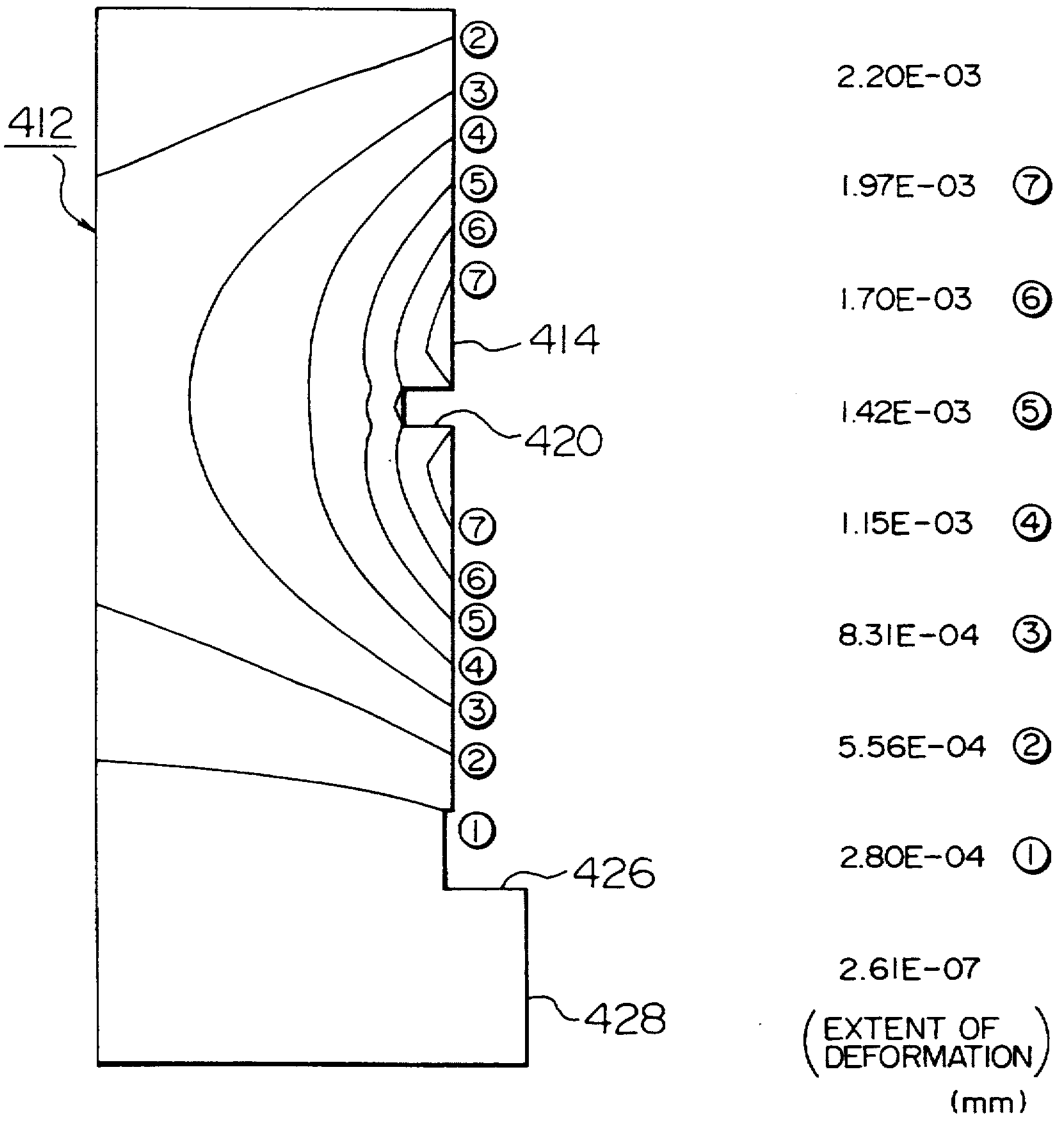
FIG. 8 PRIOR ART
FIG. 8 is an explanatory view of the extent of deformation of the valve body in the case that the high pressure fuel is introduced into the conventional three-way electromagnetic valve.

FIGS. 6A and 6B show a three-way electromagnetic valve 310 according to a third embodiment. In this embodiment, the inner valve 54, the outer valve 42 and the valve body 70 of the Embodiment 1 are changed in shape, while the other members are identical with those of the Embodiment 1. Therefore, in FIGS. 6A and 6B, only the changed portions are designated by the reference numerals on the order of 300, while the other portions are designated by the same reference numerals as those of the Embodiment 1.

As shown in FIG. 6A, in a valve body 370 used in the three-way electromagnetic valve 310 of this embodiment, the inside diameter of an outer valve sliding hole 372 is made small in the vicinity of the groove 82 but large at an opening end 372*a* and at the discharge passage 80, so that the outer valve sliding hole 372 is tapered as going from the vicinity of the groove 82 to the end portions. On the other hand, the outside diameter of an outer valve 342 is substantially uniform and unchanged throughout the overall length of a sliding portion 342*a*. Accordingly, the clearance C1 between the sliding portion 342*a* of the outer valve 342 and the outer valve sliding hole 372 is made larger as going from the vicinity of the through holes 46 of the outer valve 342 toward the end portions at the movable iron core 40 and at the poppet portion 78.

Further, in the outer valve 342, the inside diameter of an inner valve sliding hole 348 is made small at the inner chamber 58 but increased as going toward the movable iron core 40, so that the inner valve sliding hole 348 is tapered as going from the inner chamber 58 toward the movable iron core 40. On the other hand, the outside diameter of a sliding shaft portion 352 of an inner valve 354 is substantially uniform and unchanged throughout the whole sliding area. Accordingly, the clearance C2 between the sliding shaft portion 352 of the inner valve 354 and the inner valve sliding hole 348 is made larger as going from the inner chamber 58 toward the movable iron core 40.

As shown in FIG. 6B, when the high pressure fuel coming through the high pressure fuel passage 84 is supplied to the three-way electromagnetic valve 310, the valve body 370 is deformed by the pressure of the high pressure fuel flowing out through the groove 82 into the outer valve sliding hole 372 as in the case of the Embodiment 1. For this reason, the increase in the diameter of the outer valve sliding hole 372 is large in the vicinity of the groove 82 but small at the opening end 372*a* and at the discharge passage 80. However, since the sliding portion 342*a* of the outer valve 342 is tapered as described above, the clearance at the opening end 372*a* and at the discharge passage 80 can be maintained greater than the clearance in the vicinity of the groove 82. Accordingly, even if an extraneous material contained in the high pressure fuel, such as fine chip, enters through the groove 82 into the outer valve sliding hole 372, the extraneous material passing through the clearance in the vicinity of the groove 82 is made to pass through the clearance at the opening end 372*a* and at the discharge passage 80, which is maintained greater than the former clearance, with the result that there is caused no clogging with the extraneous material. Therefore, the outer valve 342 can be prevented from the bad sliding, sticking and the like caused by the accumulation of the foreign matter. Incidentally, the outer valve sliding hole 372 may be of a stepped shape in which the diameter thereof is made small only in the vicinity of the groove 82 but large in the other portions, in place of the tapered shape.

Further, even if the outer valve 342 is deformed elastically by the effect of the high pressure fuel, the clearance at the movable iron core 40 can be maintained greater than the clearance at the inner chamber 58. Accordingly, similarly to the above case, the foreign matter flowing from the inner chamber 58 into the clearance C2 is allowed to flow out toward the movable iron core 40, with the result that there is caused no accumulation of the extraneous material in the clearance C2. In consequence, the inner valve 354 can be prevented from the bad sliding, sticking and the like caused by the accumulation of the extraneous material.

Description has been made about the three-way electromagnetic valve of the present invention in conformity with the Embodiments 1 to 3, and however, the present invention is not limited to these embodiments but can be put into practice in various ways without exceeding the scope and spirit of the invention.

The extent of deformation of the outer valve caused in the vicinity of the groove is estimated at about 2 μm in terms of radius, and therefore, it will do that the clearance between the outer valve sliding hole and the outer valve outer peripheral surface is so set as to be made larger at the both ends of the outer valve sliding hole than in the vicinity of the groove in proportion to that value. It will do as well that the clearance between the outer valve and the inner valve is set in accordance with the above estimation. However, the sliding portion of the three-way electromagnetic valve is deformed in various manners in accordance the material, shape, condition of use and the like of the members to be used, and therefore, how to set the clearance is not limited to the above one.

As a modification, for example, the outer valve sliding hole of the valve body may be tapered as going from the vicinity of the groove to the end portions by making the inside diameter thereof small in the vicinity of the groove but large at both ends thereof as in the case of the Embodiment 3, and the outer periphery of the sliding portion of the outer valve may be tapered so that the diameter thereof is reduced as going from the vicinity of the through holes toward the movable iron core and the poppet portion as in the case of the Embodiment 1.

According to the three-way electromagnetic valve of the present invention, it is possible to prevent the extraneous material from accumulating in the clearances in the sliding portion, and therefore, occurrence of any bad sliding, sticking or the like caused by the accumulation of the extraneous material can be avoided.

What is claimed is:

1. A three-way electromagnetic valve for controlling opening and closing of a high pressure chamber in which a high pressure fluid is stored and a low pressure chamber in which a low pressure fluid is stored, said valve comprising:

a valve body having a sliding hole, and control, supply and discharge ports through which said sliding hole is enabled to communicate with a back pressure chamber, said high pressure chamber and said low pressure chamber, respectively; and valve means slidably disposed in said sliding hole and capable of sliding on receiving an electromagnetic force of an electromagnetic actuator, said valve means serving to change over alternatively from one of a first communication state in which said supply port and said control port are communicated with each other and a second communication state in which said control port and said discharge port are communicated with each other, wherein said supply port is opened in a sliding wall of said sliding hole in the direction perpendicular to the sliding wall, and a clearance between said sliding hole and said valve means is so set as to be made large at a position remote from said supply port but small at another position adjacent to said supply port.

2. A three-way electromagnetic valve according to claim 1, wherein said three-way electromagnetic valve is provided in a fuel injection valve so as to enable the back pressure chamber in which fuel for serving to bias a nozzle needle of said fuel injection valve in the valve closing direction is stored to communicate alternatively with the high pressure chamber in which the high pressure fuel is stored or the low pressure chamber in which the low pressure fuel is stored.

3. A three-way electromagnetic valve according to claim 2, wherein said valve means is tapered in the outer periphery thereof so that the diameter thereof is reduced as going away from the vicinity of said supply port.

4. A three-way electromagnetic valve according to claim 3, wherein said valve means has a raised portion formed in the vicinity of said supply port.

5. A three-way electromagnetic valve according to claim 4, wherein said valve means has a large-diameter portion formed in the vicinity of said supply port and a small-diameter portion formed apart therefrom with a step portion therebetween.

6. A three-way electromagnetic valve according to claim 2, wherein said sliding hole is tapered so that the inside diameter thereof is increased as going away from the portion thereof where said supply port is formed.

7. A three-way electromagnetic valve according to claim 2, wherein said sliding hole has an inward raised portion formed in the portion thereof where said supply pore is formed.

8. A three-way electromagnetic valve according to claim 2, wherein said sliding hole has a small inside-diameter portion formed in the portion thereof where said supply port is formed and a large inside-diameter portion formed apart therefrom through a step portion.

9. A three-way electromagnetic valve according to claim 2, wherein said clearance is set to be in the range from 1±0.5 μm at the minimum to 2.5 μm at the maximum.

10. A three-way electromagnetic valve for controlling opening and closing of a high pressure chamber in which a high pressure fluid is stored and a low pressure chamber in which a low pressure fluid is stored, said valve comprising:

a valve body having a sliding hole, and control, supply and discharge ports through which said sliding hole is enabled to communicate with a back pressure chamber, said high pressure chamber and said low pressure chamber, respectively;

an outer valve slidably disposed in said sliding hole and capable of sliding on receiving an electromagnetic force of an electromagnetic actuator, said outer valve serving to change over alternatively from one of a first communication state in which said supply port and said control port are communicated with each other and a second communication state in which said control port and said discharge port are communicated with each other; and an inner valve slidably disposed in a sliding hole formed by boring in said outer valve and capable of enabling said supply port and said control port to communicate with each other in a short-circuit way, wherein said supply port is opened in a sliding wall of the sliding hole of said valve body in the direction perpendicular to the sliding wall, said outer valve has an inner cheer formed in the central portion thereof so as to be continuously connected with the inner valve sliding hole formed therein and a plurality of through holes formed by boring at equal angular intervals so as to enable said inner chamber and said supply port to communicate with each other, and a clearance between said inner valve sliding hole and said inner valve is so set as to be made large at the position remote from said through holes but small at the position adjacent to said through holes.

11. A three-way electromagnetic valve according to claim 10, wherein said three-way electromagnetic valve is provided in a fuel injection valve so as to enable the back pressure chamber in which fuel for serving to bias a nozzle needle of said fuel injection valve in the valve closing direction is stored to communicate alternatively with the high pressure chamber in which the high pressure fuel is stored or the low pressure chamber in which the low pressure fuel is stored.

12. A three-way electromagnetic valve according to claim 11, wherein said outer valve has a passage by means of which said through holes and said control port are enabled to communicate with each other through said inner chamber depending on said inner valve.

13. A three-way electromagnetic valve according to claim 11, wherein said inner valve is tapered in the outer periphery thereof so that the diameter thereof is reduced as going away from the vicinity of said through holes.

14. A three-way electromagnetic valve according to claim 11, wherein said inner valve has a raised portion formed in the vicinity of said through holes.

15. A three-way electromagnetic valve according to claim 11, wherein said inner valve has a large diameter portion formed in the vicinity of said through holes and a small diameter portion formed apart therefrom through a step portion.

16. A three-way electromagnetic valve according to claim 11, wherein said inner valve sliding hole is tapered so that the inside diameter thereof is increased as going away from the portion thereof where said through holes are formed.

17. A three-way electromagnetic valve according to claim 11, wherein said inner valve sliding hole has an inward raised portion formed in the portion thereof where said through holes are formed.

18. A three-way electromagnetic valve according to claim 11, wherein said inner valve sliding hole has a small inside-diameter portion formed in the portion thereof where said through holes are formed and a large inside-diameter portion formed apart therefrom with a step portion therebetween.

19. A three-way electromagnetic valve according to claim 11, wherein the clearance between said inner valve sliding hole and said inner valve is set to be in the range from 1±0.5 μm at the minimum to 2.5 μm at the maximum.

20. A three-way electromagnetic valve for controlling opening and closing of a high pressure chamber in which a high pressure fluid is stored and a low pressure chamber in which a low pressure fluid is stored, said valve comprising:

a valve body having a sliding hole, and control, supply and discharge ports through which said sliding hole is enabled to communicate with a back pressure chamber, said high pressure chamber and said low pressure chamber, respectively;

an outer valve slidably disposed in said sliding hole and capable of sliding on receiving an electromagnetic force of an electromagnetic actuator, said outer valve serving to change over alternatively from one of a first communication state in which said supply port and said control port are communicated with each other and a second communication state in which said control port and said discharge port are communicated with each other; and an inner valve slidably disposed in a sliding hole formed by boring in said outer valve and capable of enabling said supply port and said control port to communicate with each other in a short-circuit way, wherein said supply port is opened in a sliding wall of said sliding hole in the direction perpendicular to the sliding wall, said outer valve has an inner chamber formed in the central portion thereof so as to be continuously connected with said inner valve sliding hole formed therein and a plurality of through holes formed by boring at equal angular intervals so as to enable said inner chamber and said supply port to communicate with each other, and clearances between said sliding hole and said outer valve as well as between said inner valve sliding hole and said inner valve are each set so as to be made large at the position remote from said supply port but small at the position adjacent to said supply port.

21. A three-way electromagnetic valve according to claim 20, wherein said three-way electromagnetic valve is provided in a fuel injection valve so as to enable the back pressure chamber in which fuel for serving to bias a nozzle needle of said fuel injection valve in the valve closing direction is stored to communicate alternatively with the high pressure chamber in which the high pressure fuel is stored or the low pressure chamber in which the low pressure fuel is stored.

22. A three-way electromagnetic valve according to claim 21, wherein said outer valve has a raised portion formed in the vicinity of said supply port, and said inner valve is tapered in the outer periphery thereof so that the diameter thereof is reduced as going away from the vicinity of said through holes.

23. A three-way electromagnetic valve according to claim 21, wherein said outer valve has a large-diameter portion formed in the vicinity of said supply port and a small-diameter portion formed apart therefrom through a step portion, and said inner valve is tapered in the outer periphery thereof so that the diameter thereof is reduced as going away from the vicinity of said through holes.

24. A three-way electromagnetic valve according to claim 21, wherein said outer valve sliding hole and said inner valve sliding hole are each tapered so that the inside diameter thereof is increased as going away from the portion therefrom where said supply port is formed.

25. A three-way electromagnetic valve according to claim 21, wherein said outer valve sliding hole and said inner valve sliding hole each have an inward raised portion formed in the portion thereof where said supply port is formed.

26. A three-way electromagnetic valve according to claim 21, wherein said outer valve sliding hole and said inner valve sliding hole each have a small inside-diameter portion formed in the portion thereof where said supply port is formed and a large inside-diameter portion formed apart therefrom with a step portion therebetween.

27. A three-way electromagnetic valve according to claim 21, wherein each of said clearances is set to be in the range from $1 \pm 0.5$ μm at the minimum to 2.5 μm at the maximum.

* * * * *